No. 669,597. Patented Mar. 12, 1901.
H. N. RIDGWAY.
REGISTER.
(Application filed Apr. 24, 1900.)
(No Model.) 3 Sheets—Sheet 1.
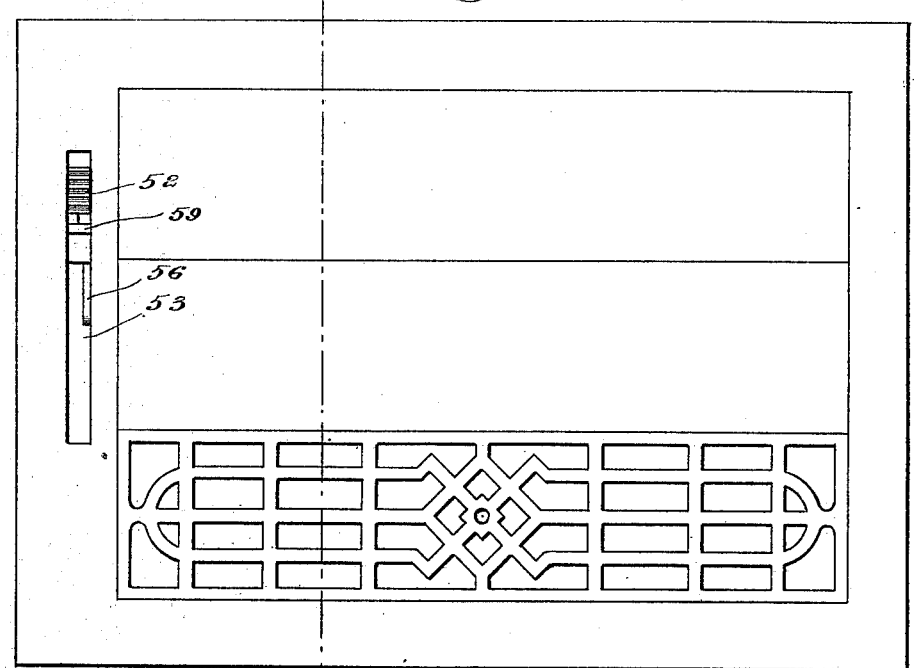
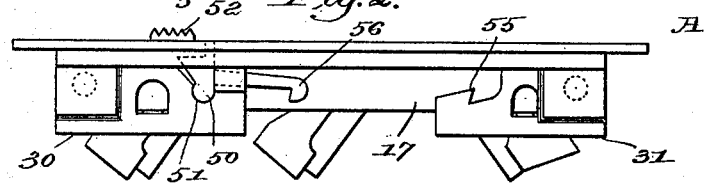
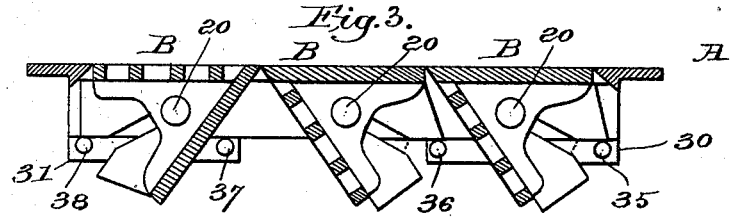
Witnesses.
Thomas J. Drummond
Adolf C. Kaiser
Inventor.
Herbert N. Ridgway,
by Ownsby & Gregory
Atty's.

No. 669,597. Patented Mar. 12, 1901.
H. N. RIDGWAY.
REGISTER.
(Application filed Apr. 24, 1900.)

(No Model.) 3 Sheets—Sheet 2.

Witnesses.
Thomas J. Drummond.
Adolf C. Kaiser.

Inventor.
Herbert N. Ridgway,
by Crosby & Gregory
Atty's.

No. 669,597. Patented Mar. 12, 1901.
H. N. RIDGWAY.
REGISTER.
(Application filed Apr. 24, 1900.)
(No Model.) 3 Sheets—Sheet 3.
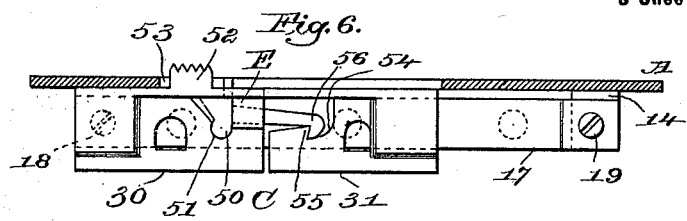
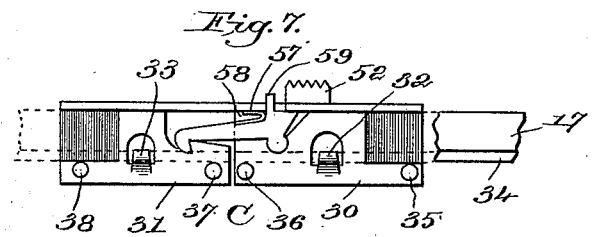
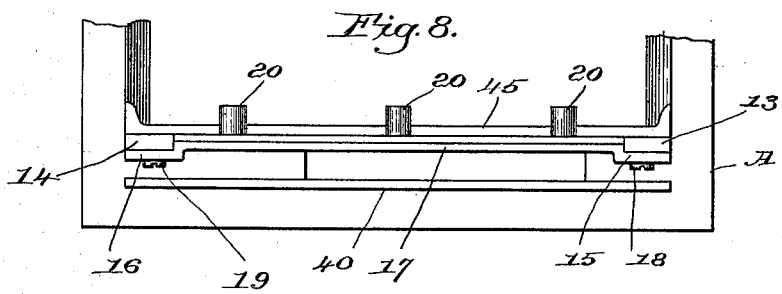
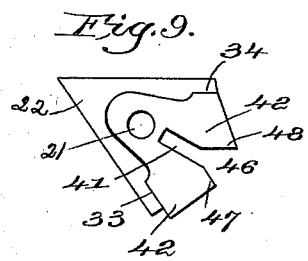
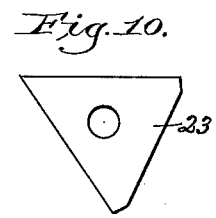
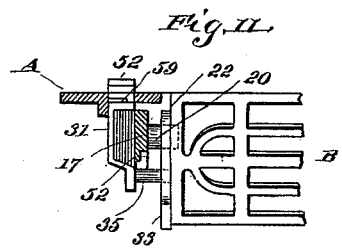
Witnesses.
Thomas J. Drummond.
Adolf C. Kaiser.
Inventor.
Herbert N. Ridgway,
by Crosby & Gregory
attys.

UNITED STATES PATENT OFFICE.

HERBERT N. RIDGWAY, OF WINTHROP, MASSACHUSETTS.

REGISTER.

SPECIFICATION forming part of Letters Patent No. 669,597, dated March 12, 1901.

Application filed April 24, 1900. Serial No. 14,095. (No model.)

*To all whom it may concern:*

Be it known that I, HERBERT N. RIDGWAY, a citizen of the United States, and a resident of Winthrop, county of Suffolk, State of Massachusetts, have invented an Improvement in Registers, of which the following description, in connection with the accompanying drawings, is a specification, like characters on the drawings representing like parts.

This invention relates to what I shall for convenience term a "register" and will describe the article as so used, although it will be obvious that it may be employed with equal facility for other purposes—for example, as a ventilator.

The invention is shown in one simple embodiment thereof in the accompanying drawings, wherein—

Figure 4:
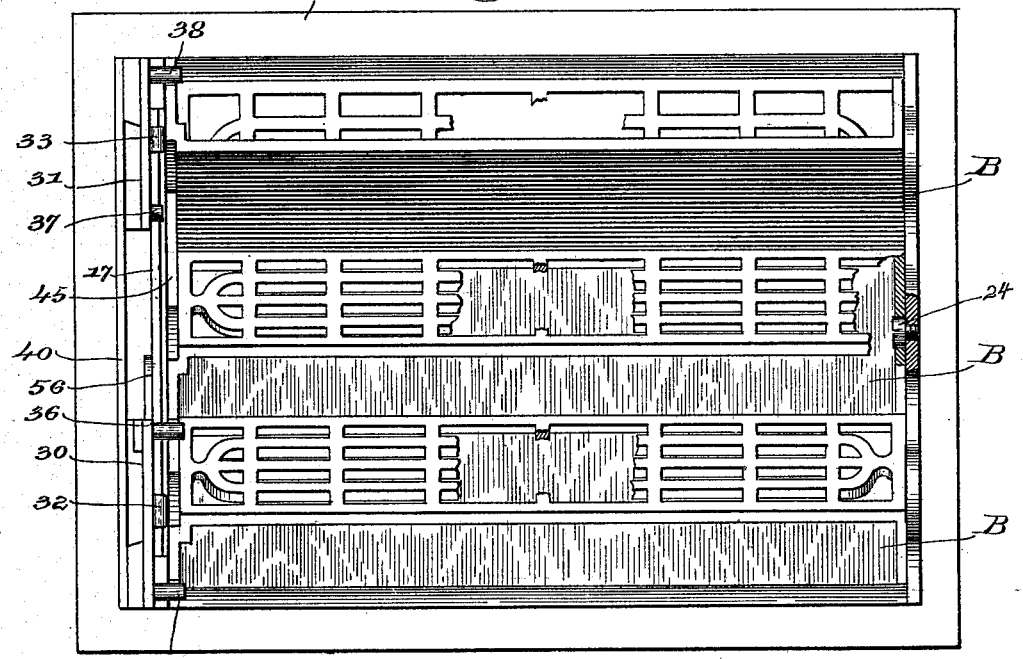
Figure 5:
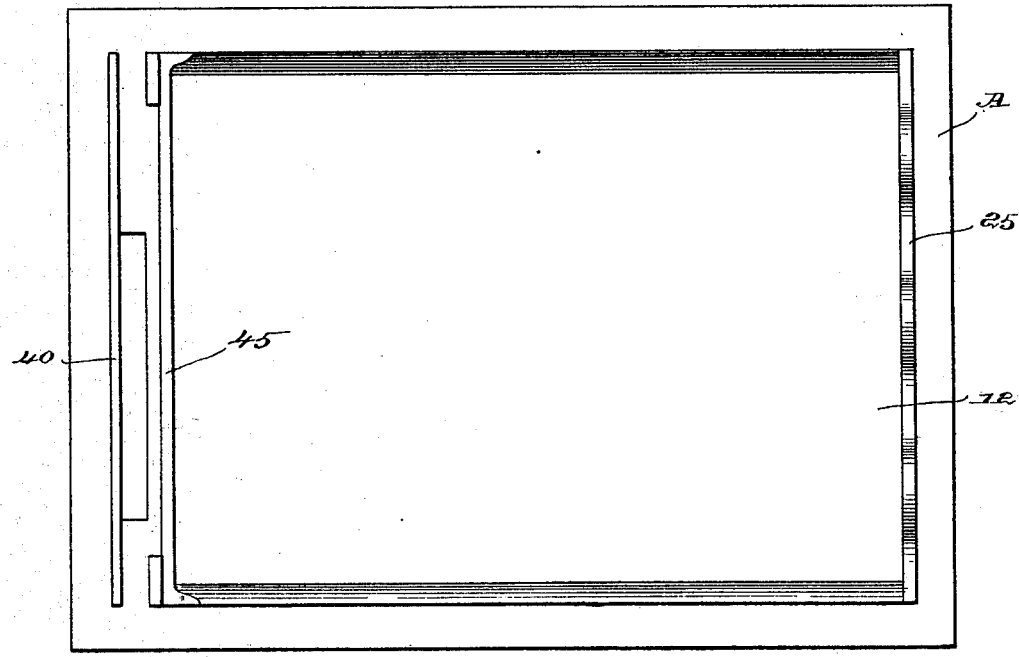

Figure 1 is a plan view of a register involving my improvements, it showing three bars with their faces in line, one of the bars being represented as having its foraminous side up. Fig. 2 is a left-hand view of Fig. 1, it showing the actuator separated. Fig. 3 is a transverse section taken in the line 5 5, Fig. 1, looking toward the left. Fig. 4 is an under side view of the same. Fig. 5 is an under side view of the frame with the bars and their operating devices removed. Fig. 6 is an end view of the actuator, its support, and a part of the frame, the latter being shown in section, the two parts of the actuator being coupled. Fig. 7 is an inside view of the same. Fig. 8 is an under side view of one end of the frame, the means for supporting the bars at one end, and a guide for the actuator. Figs. 9 and 10 are opposite end views of one of the bars. Fig. 11 is a vertical cross-section taken at the right of the right-hand end of the actuator, Fig. 6.

The improved apparatus involves as one of its features a frame, a plurality of bars, and means to operate all of them in unison or one bar independently of another. The means for operating the bars may consist of an actuator in two parts, means of suitable kind being normally effective to connect the two parts of the actuator that they may be moved in unison.

In the embodiment of the invention illustrated the bars present two faces, one of which is foraminous for the passage of air, while the other one, designated as a "valve," shuts off or obstructs the passage of air, and means are provided for actuating the bars to put their like or unlike faces in a common plane, said plane being preferably that of the outer face of the frame.

From the foregoing it will be understood that the improved register comprises a frame, a plurality of valves, and means to move them in unison or one valve independently of another; but I consider as within the scope of my invention the use of one such bar in a frame.

The present invention is in the nature of an improvement upon the apparatus shown, described, and claimed in my application, Serial No. 741,888, filed December 29, 1899.

When the passage of air or heat is to be shut off, the valves of the respective bars occupy a position in subsantially the same plane and which is that of the outer face of the frame, whereby the register presents at its outer side a continuous closed surface upon which dust, dirt, and sweepings will lodge, but will not enter the hot-air pipe, which is of utility, as the shutters of ordinary registers when closed receive and support sweepings and permit the entrance of such sweepings and other dirt into the hot-air pipes, and such dirt is subsequently returned into the room with the hot air from such pipes when the shutters are opened.

The frame is denoted by A and may support any desired number of bars, as B.

In the embodiment of the invention as illustrated the opening 12 in the frame is free and unobstructed and the bars are adapted to fill this space. The space may be closed to the extent desired by shutting one or more of the valve-sections, or it may be left open to permit the passage therethrough of air.

The bars B are acute angular in cross-section, whereby when brought into alinement within the opening or space 12 they will completely fill the same, and at such time their outer faces will be in substantially the same plane one with the other and with the outer face of the frame.

The frame has upon the under side thereof depending lugs, as 13 and 14, (see Fig. 8,) to which offset portions, as 15 and 16, respectively, of a guide or track, as 17, extending transversely of the frame, are detachably secured by suitable means, as screws 18 and 19. This guide or track, as will hereinafter appear, constitutes a convenient support for a two-part actuator, which may operate all the bars in unison or one or more of them independently of the other or others, and it has upon its inner side a series of studs 20, constituting pivots for one end of the bars B, said studs entering openings, as 21, in the ends 22 of said bars. The opposite ends 23 of the bars are adapted to receive pivot-screws, as 24, Fig. 4, tapped into the flange 25, depending from the end of the frame.

The construction just described constitutes a convenient one for readily assembling the bars in the frame. To provide for operating one bar independently of another, the actuator C (see Figs. 6 and 7) is composed of two parts 30 and 31, each part independently slidable upon the guide or track 17 and having lugs, as 32 and 33, upon their inner faces, which embrace the lower edge 34 of the guide or track 17. The actuator has a series of inwardly-disposed pins or projections, as 35, 36, and 38, hugging the under side of the track or guideway 17 and serving, with the lugs 32 and 33, to hold the actuator in position upon the track. The pins 35, 36, and 38 also serve to swing the pivoted bars alternately in opposite directions to bring either their valve or foraminous faces in substantially the same plane and in substantially the plane of the outer face of the frame. The sidewise movement of the actuator C is prevented by a flange, as 40, upon one of the end bars of the frame disposed in parallelism with the track and adapted to be engaged by the actuator during its stroke.

The pins 35, 36, and 38, before mentioned, are adapted to enter slots 41, formed in offsets, as 42, at the ends of the bars, said offsets being conveniently formed integral with the bars and having shoulders 33 and 34, respectively, (see Fig. 9,) adapted to alternately engage a ledge, as 45, extending practically entirely across the frame, near one end thereof, (see Fig. 4,) the ledge serving as a convenient stop to position the bars, so that one section of each may be properly alined with desired sections of the others. The slot 41 has a flaring mouth, as 46, this construction forming beveled faces 47 and 48 for the walls of the slot.

With the parts in the positions represented in Fig. 1 and certain of the sections of the bars being horizontally alined the pins 35, 36, and 38 of the actuator are in contact with one of the beveled faces 47 and 48 of the slots, so that on the movement of the sliding actuator the pins will be caused to ride along said faces and thereafter enter the straight or radial portions of the slots to swing the bars around their axes and bring other faces of the bars into line, and the motion being continued the pins riding along the opposite beveled faces until one of the shoulders 43 or 44 strikes the ledge 45, which arrests the bars, with their faces in alinement, and the pins serve to prevent any backward movement of said bars.

The two parts of the actuator C are normally connected by a coupler of suitable kind, whereby the several bars thereof can be moved in unison or said parts can be disconnected in such manner that one part thereof can be moved back and forth, whereby one or more bars can be operated independently of the other or others. In the present case the part 31 has hand-controlled means for operating the same, and it governs two of the bars, so that they can be operated to bring either their foraminous or valve faces into line to either shut off or permit the supply of heat to an apartment or to partially cut off the heat. The coupler for the two parts of the actuator is denoted by E, and it consists of a lever having a rounded fulcrum, as 50, fitted into a correspondingly-shaped seat 51 in the part 30, which, it will be seen upon inspection of Fig. 6, has a projection, as 52, extending through the longitudinal slot 53 in the register-frame.

The part 31 of the actuator is recessed, as at 54, thereby forming a shoulder, as 55, which the hook 56 of the coupler-lever E is adapted normally to engage, it being held in such position preferably by a spring, as 57. The working arm of the lever extends through an opening 58 in the part 30, and this opening receives the spring 57, adapted to rest against the lever and the outer wall of the opening 58, so as to hold the hooked end of said lever normally in its effective position. The lever has a projection or trip, as 59, extending through the slot 53 and in proximity to the finger or foot piece 52. By pressing the projection 59 toward the projection or trip or foot piece 52 the hook 56 of the lever can be raised and disengaged from the shoulder, so as to disconnect the two parts of the actuator, whereby the part 30 thereof can be moved independently of its companion to operate two of the bars independently of the other.

So long as the two parts of the actuator are coupled they operate the two bars in unison.

For cheapness in manufacture I may cast the frame, the flange 25, ledge 45, and flange 40 in one piece, and for the same reason I prefer to so manufacture the bars B and the offsets 42.

I have used certain terms herein, but wish it understood that they have been adopted merely for convenience. For example, I intend to include within the meaning of the word "bar" any device capable of performing a function like that hereinbefore described.

Having described my invention, what I claim, and desire to secure by Letters Patent, is—

1. In an apparatus of the class described, a frame, a plurality of bars movable into substantially the plane of the outer face of said frame to open and close the same to the passage of air, a two-part actuator for said bars, and a coupler for normally locking said two parts together, said coupler being provided with a trip for disengaging the two parts of the actuator from locked position.

2. In an apparatus of the class described, a frame having an opening therein, a plurality of bars movable in said frame to open and close the same to the passage of air, a two-part sliding actuator for said bars, and means to normally connect said two parts.

3. In an apparatus of the class described, a frame, a plurality of bars movable in said frame to open or close the same to the passage of air, a two-part actuator for said bars, and a spring-operated coupler to normally connect the two parts of the actuator.

4. In an apparatus of the class described, a frame, a plurality of bars movable in said frame to open or close the same to the passage of air, a two-part actuator for said bars, and a coupling device to normally connect the two parts of the actuator, said coupling device being provided with an engaging projection by which to disconnect the said two parts.

5. In an apparatus of the class described, a frame, a plurality of bars movable in said frame to open or close the same to the passage of air, an actuator in two parts having a projection by which said actuator can be operated, and a coupling device adapted to connect the two parts of the actuator and also having a projection by which it can be operated to disconnect the two parts of the actuator.

6. In an apparatus of the class described, a frame having a slot, a plurality of bars movable in said frame to open or close the same to the passage of air, an actuator in two parts having a projection by which said actuator can be operated, the projection extending through said slot, and a coupling device for connecting the two parts of the actuator, it also having a projection extending through said slot for operating the coupling device.

7. In an apparatus of the class described, a frame, a plurality of bars, a guide upon the frame, a two-part slide mounted to move upon the guide and having means to actuate said bars, and means to normally couple the two parts of the slide.

8. In an apparatus of the class described, a frame, a guide upon the frame, a slide formed in two parts, each supported by the guide, means to normally couple said parts, a plurality of swinging bars, pivots for the bars sustained by said guide, and means movable with the slide to operate said bars.

9. In an apparatus of the class described, a frame, a guide upon the frame, a two-part pin-carrying slide supported by the guide, means to normally connect the two parts of the slide, a plurality of swinging bars having slots at one end to be entered by said pins, and pivots for the bars, sustained by the guide.

10. In an apparatus of the class described, a frame, a plurality of bars acute angular in cross-section and presenting at one end an open slot having a locking portion, and means to enter and operate said bars.

11. In an apparatus of the class described, a bar angular in cross-section and presenting end walls, one of which has an open flaring slot presenting locking-faces.

12. In an apparatus of the class described, a bar angular in cross-section and presenting end walls, one of which has an open flaring slot presenting locking-faces, and said end having a plurality of shoulders.

13. In a register, a frame having a stop on the side thereof, a valve pivotally supported by the frame and provided at its end with a slot presenting shoulders, and means to turn said bars that either shoulder may meet the stop to arrest the bar in either of its extreme positions.

14. In a register, a frame, a valve pivoted inside the frame to close the register against the passage of air through it, said valve having a cam-surface and a locking-surface, the latter occupying a position substantially parallel with the plane of the top of the register when the valve occupies its closed position, and a device acting on said cam-surface to turn the valve, and by contact with the locking-surface to lock the valve so that it cannot be turned by pressure thereon at the face of the frame.

15. In a register, a frame, valves pivoted inside the frame and having perforate and imperforate faces to open and close the frame to the passage of air, said valves having a cam-surface and a locking-surface, the latter occupying a position substantially parallel with the plane of the top of the register when the valves occupy their closed position, and a device acting on such cam-surface to turn the valves, and by contact with the locking-surface to lock the valves so that they cannot be turned by pressure thereon at the face of the frame.

16. A register comprising a frame, a valve-section movable in said frame having two faces, one for the passage of air and the other to stop the passage of air, said valve-section being provided at one end with a slot having an enlarged outer portion, a slide or actuator provided with a pin in engagement with said slot, said pin serving to lock the valve-section from turning in one direction when in engagement with the wall of the enlarged portion of the slot and to actuate or turn said section when moved against the wall of the narrow portion of the slot.

17. A register comprising a frame, a valve-section movable in said frame and having two faces, one for the passage of air and the other to stop the passage of air, said valve-section being provided at one end with a slot having an enlarged outer portion, stops adjacent the walls of said enlarged outer portion of the slot adapted to engage a portion of the frame to prevent turning of the section in one direction, a slide or actuator provided with a pin in engagement with said slot, said pin serving to lock the valve-section from turning in the other direction when in engagement with wall of the enlarged portion of the slot and to actuate or turn said section when moved against the wall of the narrow portion of the slot.

In testimony whereof I have signed my name to this specification in the presence of two subscribing witnesses.

HERBERT N. RIDGWAY.

Witnesses:
GEO. W. GREGORY,
MARGARET A. DUNN.